United States Patent
Ramos et al.

(10) Patent No.: US 10,080,382 B2
(45) Date of Patent: Sep. 25, 2018

(54) METHOD FOR REMOVING AN OUTER SURFACE OF PRODUCE

(71) Applicant: Garlic Shaker, Inc., Las Vegas, NV (US)

(72) Inventors: Matthew Ramos, San Diego, CA (US); Adam Wagner, Los Angeles, CA (US)

(73) Assignee: GARLICSHAKER, INC., Las Vegas, NV (US)

( * ) Notice: Subject to any disclaimer, the term of this patent is extended or adjusted under 35 U.S.C. 154(b) by 555 days.

(21) Appl. No.: 14/605,825

(22) Filed: Jan. 26, 2015

(65) Prior Publication Data

US 2015/0208714 A1 Jul. 30, 2015

Related U.S. Application Data

(60) Provisional application No. 61/932,736, filed on Jan. 28, 2014.

(51) Int. Cl.
*A23N 15/08* (2006.01)
*A47J 17/02* (2006.01)

(52) U.S. Cl.
CPC .............. *A23N 15/08* (2013.01); *A47J 17/02* (2013.01)

(58) Field of Classification Search
CPC .................................. A23N 15/08; A47J 17/02
See application file for complete search history.

(56) References Cited

U.S. PATENT DOCUMENTS

| | | | | |
|---|---|---|---|---|
| 1,384,356 A | * | 7/1921 | Smith | A23N 7/02 99/629 |
| 2,262,383 A | * | 11/1941 | Carlson | A47J 17/18 99/633 |
| 2,376,106 A | * | 5/1945 | Witthofft | A23N 7/02 366/220 |

(Continued)

FOREIGN PATENT DOCUMENTS

| | | | |
|---|---|---|---|
| CN | 103169361 | * | 6/2013 |
| CN | 203207770 | * | 9/2013 |

(Continued)

OTHER PUBLICATIONS

American Heritage Dictionary. 2018. https://www.ahdictionary.com/word/search.html?q=abrade.*

(Continued)

*Primary Examiner* — Anthony Weier
(74) *Attorney, Agent, or Firm* — The Mueller Law Office, P.C.

(57) ABSTRACT

Shown herein is a vessel having a rigid cylinder having an inside surface, an outside surface, a middle area, a first end and a second end opposite the first end. The first end is open. A frictional surface is located on the inside surface of the cylinder and in the middle area of the cylinder, and is capable of engaging with produce placed inside the cylinder. A first mounting surface extends from the first end of the cylinder and a first cap is removable and configured to couple with the first mounting surface on the first end. The outside surface of the cylinder is configured to engage with a hand of a user. When the produce is placed inside the cylinder and the user shakes the vessel, the produce engages the frictional surface to remove an outer surface of the produce.

9 Claims, 12 Drawing Sheets

(56) References Cited

U.S. PATENT DOCUMENTS

| | | | | |
|---|---|---|---|---|
| 2,748,819 | A | * | 6/1956 | Mayer ............... A47J 17/18 99/631 |
| 2,866,487 | A | * | 12/1958 | Heinrich ............ A47J 17/18 99/631 |
| 2,912,803 | A | * | 11/1959 | Simjian ............. B24B 31/00 366/220 |
| 2,938,556 | A | * | 5/1960 | De Mille ............ A47J 17/18 134/145 |
| 3,192,977 | A | * | 7/1965 | Bean ................. A23N 7/01 426/483 |
| 3,420,286 | A | * | 1/1969 | Vanhoegaerden ...... A23L 5/57 426/287 |
| 4,003,555 | A | | 1/1977 | Swartz |
| 4,211,002 | A | * | 7/1980 | Kirk .................. A47J 17/14 30/123.3 |
| 5,573,803 | A | | 11/1996 | Omessi |
| 5,950,529 | A | * | 9/1999 | Molloy ............... A23N 7/02 99/516 |
| 5,996,483 | A | | 12/1999 | Yip |
| 6,244,529 | B1 | | 6/2001 | Tardif et al. |
| D616,703 | S | | 6/2010 | Joy et al. |
| 7,959,346 | B2 | | 6/2011 | Loden |
| 2003/0138536 | A1 | | 7/2003 | Staehr |
| 2005/0044716 | A1 | * | 3/2005 | Karyo ............... A47J 17/02 30/123.5 |
| 2005/0120892 | A1 | | 6/2005 | McKee |
| 2007/0267422 | A1 | | 11/2007 | Barducci |
| 2008/0072772 | A1 | | 3/2008 | Haimoff et al. |
| 2013/0248536 | A1 | | 9/2013 | Prum et al. |

FOREIGN PATENT DOCUMENTS

| | | | |
|---|---|---|---|
| DE | 29617381 | * | 12/1996 |
| FR | 2535191 | * | 5/1984 |
| GB | 222249 | * | 10/1924 |
| GB | 556659 | * | 10/1943 |
| JP | 62-272958 | * | 11/1987 |

OTHER PUBLICATIONS

Fox. "Roasty, not toasty". 2002. http://www.newscientist.com/article/mg17623702-500-roasty-not-toasty/.*

"What's the Fastest Way to Peel a Bunch of Garlic?", http://lifehacker.com/whats-the-fastest-way-to-peel-a-bunch-of-garlic-513449892, Oct. 21, 2013, 3 pages.

International Search Report and Written Opinion dated Apr. 15, 2015 for PCT Application No. PCT/US15/12954.

* cited by examiner

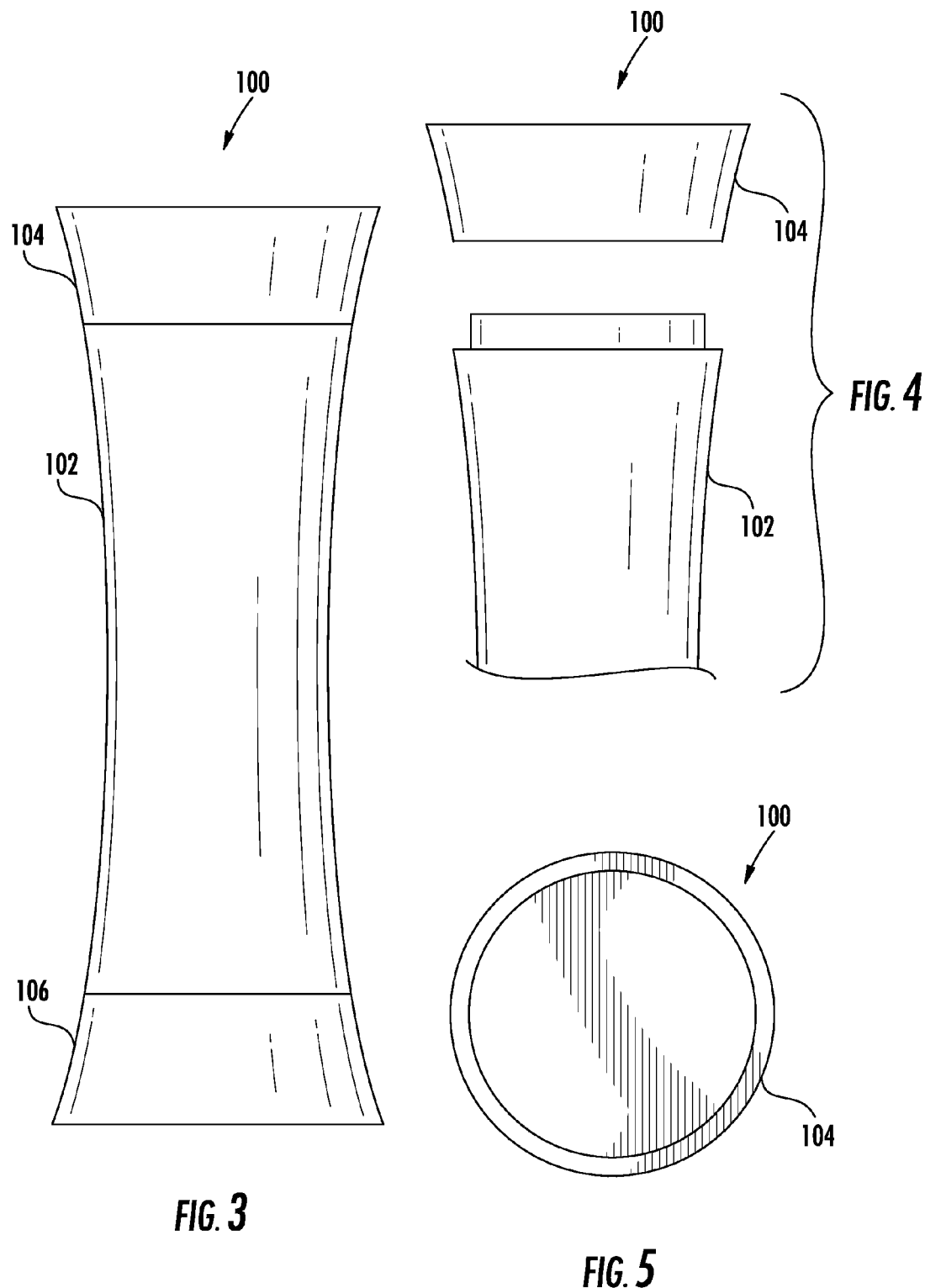

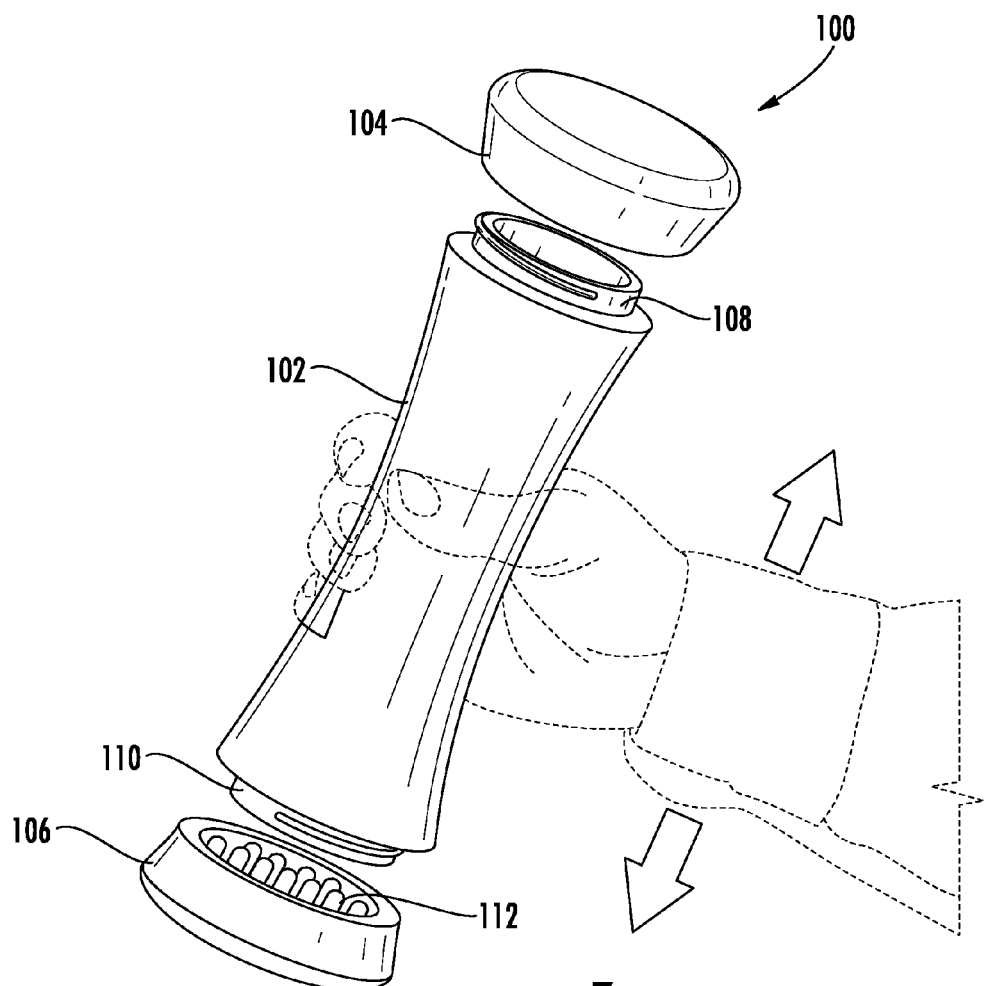
FIG. 7
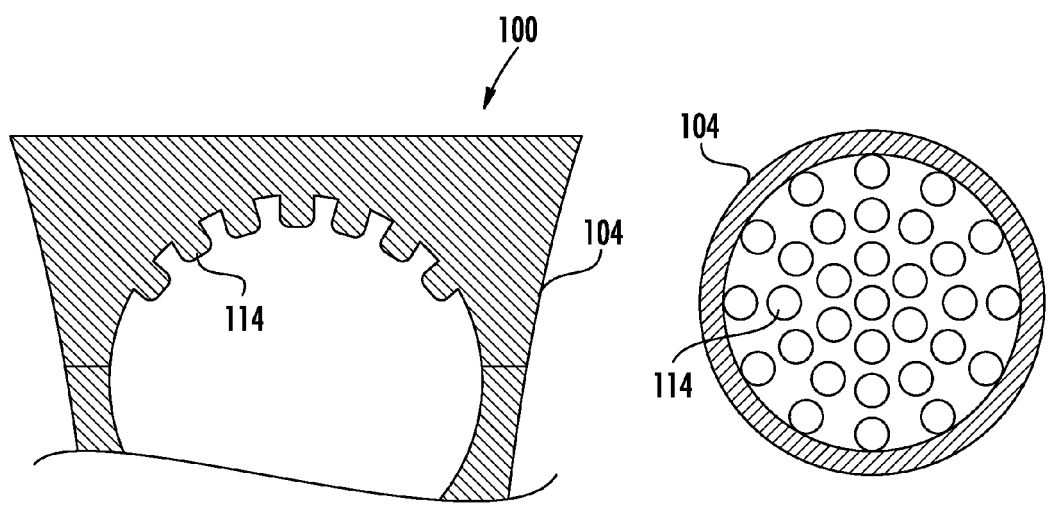
FIG. 8
FIG. 9

METHOD FOR REMOVING AN OUTER SURFACE OF PRODUCE

CROSS REFERENCE TO RELATED APPLICATIONS

This patent application claims priority from U.S. Provisional Patent Application No. 61/932,736 filed on Jan. 28, 2014 which is incorporated by reference.

BACKGROUND

Produce and nuts are staple foods around the world. The preparation of produce (e.g., fruits, vegetables, and nuts) is often aided by various kitchen tools, appliances, and/or utensils of various types and capabilities. Produce skin removal or nut shell removal is often aided by these tools, appliances, and utensils.

Hand-held devices for peeling the skin off of fruits, nuts, and vegetables are numerous and varied. Many of these devices require a reasonable amount of strength, dexterity, and precision to effectively remove the skin off of the food. These devices often have sharp edges and difficult designs for handling and operating techniques which require significant manual strength, dexterity, precise motions, a strong grip, and/or good eyesight. Typically, it is difficult for people with physical injuries or disabilities to operate these devices. For example, the removal of garlic skin, the outer surface of produce, or nut shells without damaging the food or injuring the user who is operating the hand-held device may be difficult or even impossible if the user isn't strong enough or has a previous injury or disability. Additionally, current hand-held garlic or produce skin peelers, and nut shell removers are designed to prepare small amounts of food slowly, being incapable of preparing larger amounts of food in a timely fashion.

Hand peeling, rather than using a device, is an often time consuming, difficult, and possibly dangerous leaving smelly odors and stains upon the hands of the person doing the hand peeling. Hand peeling may also be unsanitary and unsafe because of the potential for spreading food borne illnesses from their hands or from the surface, or due to the potential for injuring the hands of the person peeling.

Electric or electronic devices or mechanically driven appliances may damage the food in the process of preparing it or during the produce skin removal process, and are often difficult to operate and clean. These appliances may have difficult or complicated components and may be dangerous to use due to high speed blades or electrical or component failure.

SUMMARY

Disclosed herein is a vessel comprising a rigid cylinder having an inside surface, an outside surface, a middle area, a first end and a second end opposite the first end. The first end is open. A frictional surface is located on the inside surface of the cylinder and in the middle area of the cylinder, and is capable of engaging with produce placed inside the cylinder. A first mounting surface extends from the first end of the cylinder and a first cap is removable and configured to couple with the first mounting surface on the first end. The outside surface of the cylinder is configured to engage with a hand of a user. When the produce is placed inside the cylinder and the user shakes the vessel, the produce engages the frictional surface to remove an outer surface of the produce.

The present invention is better understood upon consideration of the detailed description below in conjunction with the accompanying drawings and claims.

BRIEF DESCRIPTION OF DRAWINGS

FIG. 3 is a front view of an example embodiment of the food or produce shaker with the first cap and second cap coupled to the body;

FIG. 4 shows a section of the front view of an example embodiment of the food or produce shaker with the first cap removed from the body;

FIG. 5 depicts a top view of an example embodiment of the food or produce shaker;

FIG. 7 illustrates a perspective view of an example embodiment of the produce shaker with the second cap having a set of a plurality of protrusions;

FIGS. 8 and 9 are example embodiments of the cap of the produce shaker;

DETAILED DESCRIPTION

Figure 1:
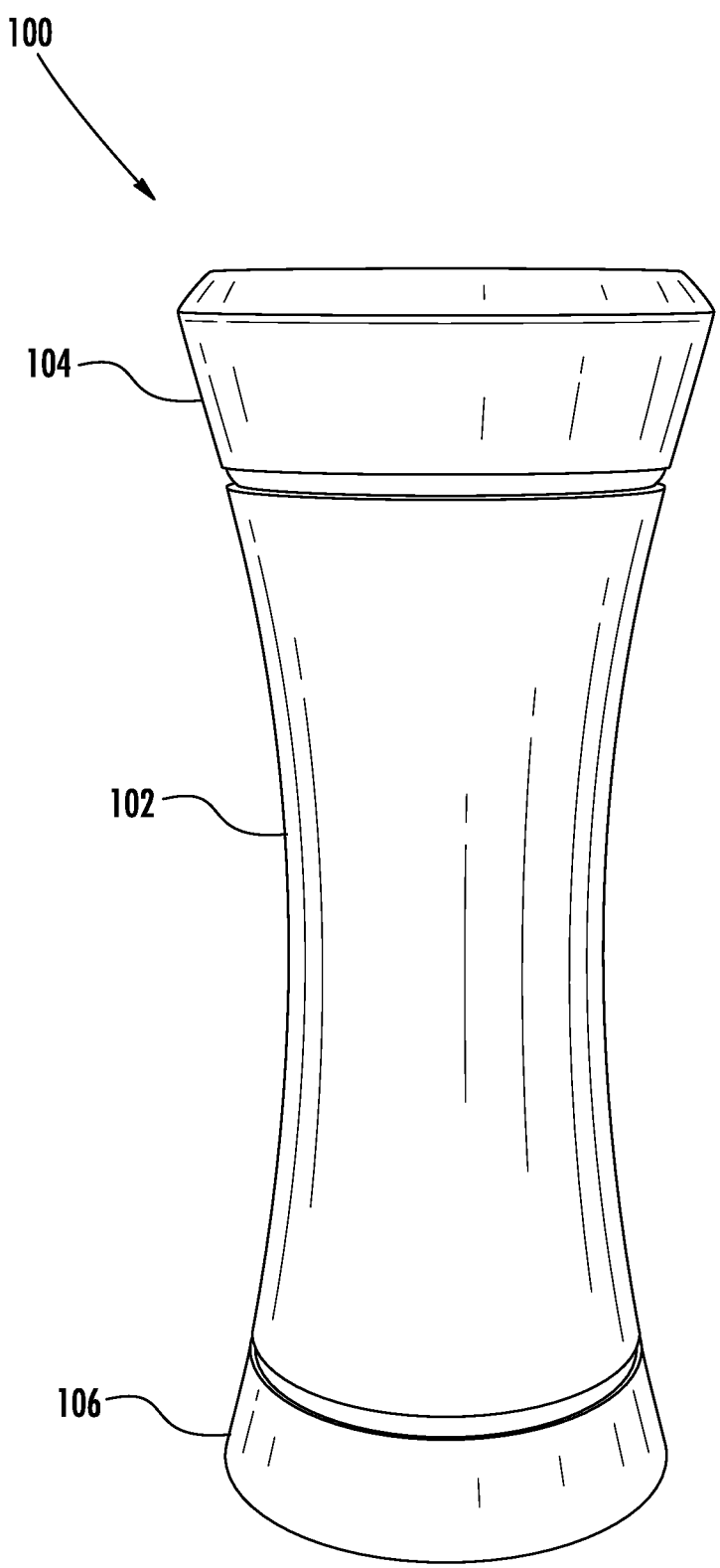
FIGS. 1 and 2 depict perspective views of an exemplary food or produce shaker.

Disclosed herein is a vessel for peeling produce. The peeling may be for removing an outer surface of the produce, such as the external skin on one or more cloves or bulbs of garlic or removing the shells of nuts by utilizing force, such as shaking, upon the vessel. When force is exerted upon the vessel, the contents enclosed make contact with the varied frictional surfaces inside the vessel causing the removal of the outer surface of the produce.

The vessel includes a rigid cylinder having an inside surface, an outside surface, a middle area and a first end and a second end opposite the first end. The first end is open. A frictional surface is located on the inside surface of the cylinder and in the middle area of the cylinder. The frictional surface is capable of engaging with produce placed inside the cylinder. A first mounting surface extends from the first end of the cylinder. A first cap is removable and configured to couple with the first mounting surface on the first end. The outside surface of the cylinder is configured to engage with a hand of a user. When the produce is placed inside the cylinder and the user shakes the vessel, the produce engages the frictional surface to remove an outer surface of the produce.

The first cap may be coupled to the first mounting surface by bayonet mounts, threads, clip-on, snap fit or magnets. In one embodiment, the second end may be open. In another embodiment, the second end may be closed. The vessel may further comprise a second mounting surface. The second mounting surface may extend from the second end of the cylinder. A second cap may be removable and may be configured to couple with the second mounting surface on the second end. The second cap may be coupled to the second mounting surface by bayonet mounts, threads, clip-on, snap fit or magnets.

The cylinder has a diameter of the middle area. The diameter may be less than the diameter of the first end and less than the diameter of the second end. In one embodiment, the cylinder may have an hourglass shape.

In one embodiment, the frictional surface may be a plurality of spiral projections. The plurality of spiral projections may be approximately 3.2 millimeters in diameter with approximately 38.1 millimeters between the spiral projections. The frictional surface may extend from the first end of the cylinder to the second end of the cylinder. The frictional surface may be coupled to the inside surface of the cylinder. The frictional surface may be made from plastic, composite, wood, metal or glass.

Upon shaking the vessel, the outer surface of the produce may be removed in 10 to 60 seconds. In one embodiment, the produce to be peeled may be garlic.

Disclosed herein is a method for removing an outer surface of a produce. A rigid cylinder is provided having an inside surface, an outside surface, a middle area, a first end and a second end opposite the first end. The first end is open. A frictional surface on the inside surface of the cylinder and in the middle area of the cylinder is provided. The frictional surface is capable of engaging with produce placed inside the cylinder. A first mounting surface extending from the first end of the cylinder is provided. The produce is placed inside the cylinder. A first cap is coupled with the first mounting surface on the first end. The cylinder is shaken to engage the produce with the frictional surface and to remove an outer surface of the produce. The outside surface of the cylinder is configured to engage with a hand of a user.

The first cap may be coupled to the first mounting surface by bayonet mounts, threads, clip-on, snap fit or magnets. The cylinder has a diameter of the middle area. The diameter may be less than the diameter of the first end and less than the diameter of the second end. In one embodiment, the cylinder may have an hourglass shape.

In one embodiment, the frictional surface may be a plurality of spiral projections. The plurality of spiral projections may be approximately 3.2 millimeters in diameter with approximately 38.1 millimeters between the spiral projections. The frictional surface may be made from plastic, composite, wood, metal or glass.

Upon shaking the cylinder, the outer surface of the produce may be removed in 10 to 60 seconds. In one embodiment, the produce to be peeled may be garlic.

Figure 2:
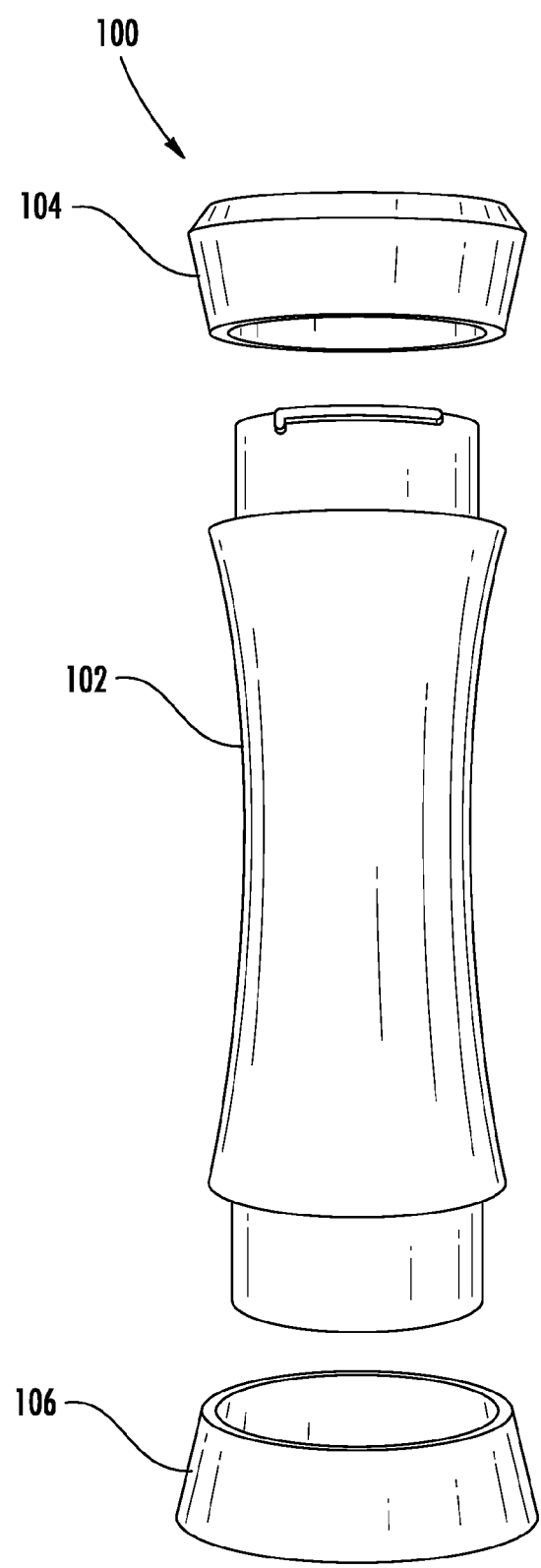

FIGS. 1 and 2 depict perspective views of an exemplary food or produce shaker. In one embodiment, a produce shaker 100 is comprised of a body 102, first cap 104 and a second cap 106. The body 102 may be a rigid cylinder having an inside surface, an outside surface, a middle area, a first end and a second end opposite the first end. The first end of the body 102 may be open. The first cap 104 may be removable. The second end of the body 102 may be open and have a second cap 106. The second cap 106 may be removable. In another embodiment, the second end may be closed such as having a non-removable, permanent second cap 106 in a fixed position. FIG. 3 is a front view of an example embodiment of the food or produce shaker 100 with the first cap 104 and second cap 106 coupled to the body 102. FIG. 4 shows a section of the front view of an example embodiment of the food or produce shaker 100 with the first cap 104 removed from the body 102. FIG. 5 depicts a top view of an example embodiment of the food or produce shaker 100.

In an exemplary embodiment, the produce shaker 100 has a diameter of the middle area. The diameter may be less than the diameter of the first end and less than the diameter of the second end. In this way, the produce shaker 100 may have an hourglass shape. The hourglass shape may be a symmetric shape being wide at the ends and narrow and contoured in the middle. The outside surface of the produce shaker 100 is configured to engage with a hand of a user. Other shapes may be used to create the exterior form of the produce shaker 100 including plane shapes, circle, square, triangle, octagon, ellipse, oval, face, quatrefoil, curvilinear triangle, rectangle, trapezoid, rhombus, pentagon, hexagon, parallelogram, crescent, cube, sphere, cone, pyramid or rectangular prism, equilateral triangle, isosceles triangle, scalene triangle, right triangle, obtuse triangle, acute triangle, kite, irregular triangle, irregular quadrilateral, heptagon, nonagon, decagon, irregular pentagon, irregular hexagon, irregular heptagon, irregular octagon, irregular nonagon, irregular decagon, triangular prism, hexagonal prism, triangular-based pyramid, square based pyramid, hexagonal pyramid, tetrahedron, octahedron, dodecahedron, polygons, concave polygons, constructible polygons, convex polygons, cyclic polygons, equiangular polygons, equilateral polygons, regular polygons, henagon, digon, acute triangle, equilateral triangle, obtuse triangle, rational triangle, right triangle, 30-60-90 triangle, isosceles right triangle, Kepler triangle, scalene triangle, quadrilateral shapes and triangles, cyclic quadrilateral, lozenge, rhomboid, tangential quadrilateral, trapezoid or trapezium, isosceles trapezoid, hendecagon, dodecagon, hexadecagon, icosagon, star without crossing lines, star polygon, stars with crossing lines, hexagram, heptagram, octagram, decagram, pentagram, henagon, digon, icosagon, hendecagon, annulus arbelos, Archimedes' twin circles, Bankoff circle, circumcircle, excircle, incircle, nine-point circle, circular sector, circular segment, various lemniscates, lunes, Reuleaux polygon, Reuleaux triangle, lens, vesica piscis, salinon, magatama, triquetra, Yin-Yang scalene triangles, semi-circles, icosahedrons, cuboids; vertex and vertices, convex and concave shapes, inverse angles, singular or tessellations, arcs and edges of any geometric shapes.

In another embodiment, the produce shaker 100 may be a two-piece body design, such as a cylinder, detachable at the middle area along a horizontal plane or a vertical plane. The first portion of the body and the second portion of the body may be mirror images of one another. For example, the first portion of the body may be hollow and rigid having an inside surface, an outside surface, a middle area, a first end and a second end opposite the first end. The first end may be open with a removable first cap. The second end may be open as well with a removable or permanent second cap. The second portion of the body may be a mirror image of the first portion. In this way, the first portion and the second portion may be coupled together to form the body (refer to FIG. 10).

Figure 6:
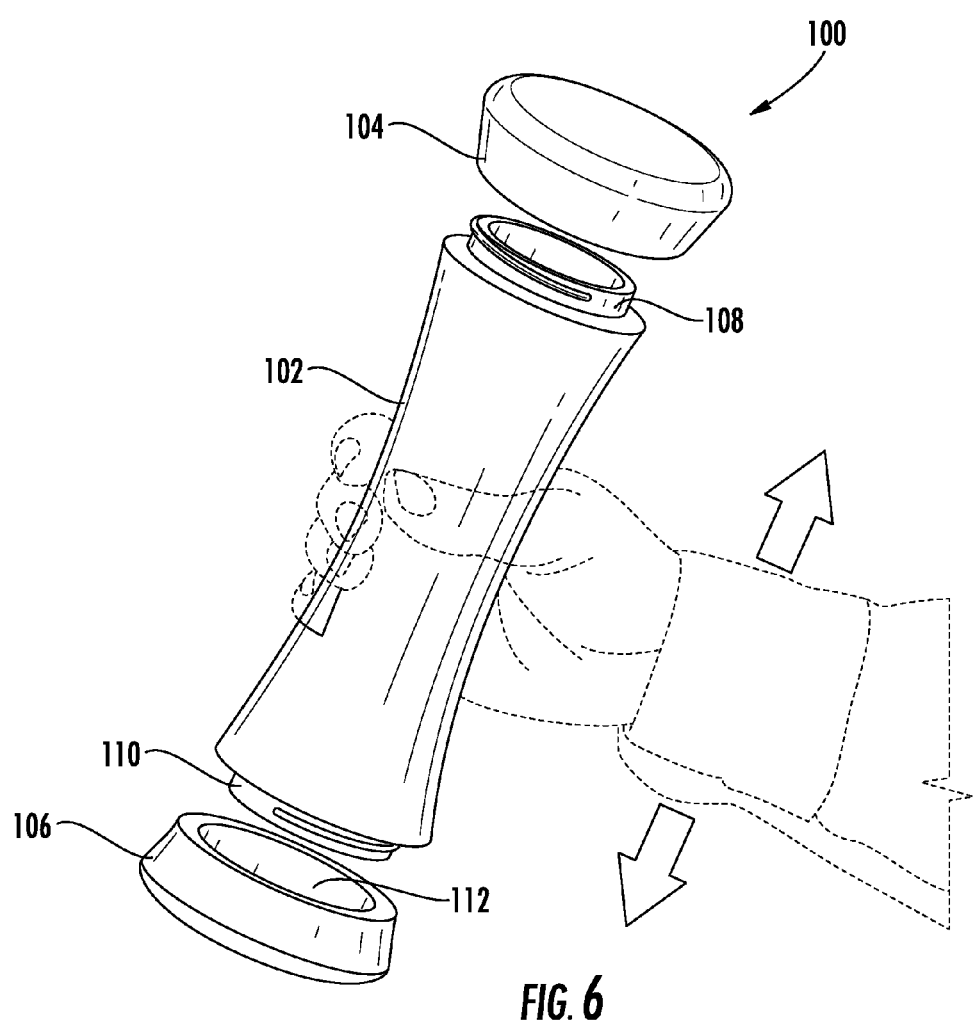
FIG. 6 shows a perspective view of an example embodiment of the produce shaker with the second cap having a smooth interior face.

FIG. 6 shows a perspective view of an example embodiment of the food or produce shaker 100 with the second cap having a smooth interior face. On the food or produce shaker 100, a first mounting surface 108 may extend from the first end of the body 102. A second mounting surface 110 may extend from the second end of the body 102. The first cap 104 may be configured to couple with a first mounting surface 108 on the first end. The second cap 106 may be configured to couple with the second mounting surface 110 on the second end. In one embodiment, the first cap 104 and the second cap 106 may have a smooth interior face 112. The outer surface of the first cap 104 and of the second cap 106 may be smooth and flat.

FIG. 7 illustrates a perspective view of an example embodiment of the produce shaker 100 with the second cap 106 having a set of a plurality of protrusions. In this embodiment, the first cap 104 and the second cap 106 may each have a set of a plurality of protrusions 114 on the interior face of the respective cap which extend into the body 102 when the first cap 104 and second cap 106 are coupled with the first mounting surface 108 and the second mounting surface 110 respectively, thus enclosing the vessel. The plurality of protrusions 114 may be flat and convex shaped. FIGS. 8 and 9 are example embodiments of the cap of the food or produce shaker 100. The plurality of protrusions 114 may be approximately 6.35 millimeters in diameter with approximately 3.175 millimeters between the protrusions. The size and shape of these may vary to any suitable diameter, and the distance between the protrusions may be increased or decreased to any suitable width or length. The plurality of protrusions 114 may be made from plastic, composite, wood, metal, glass or similar materials.

Figure 10:
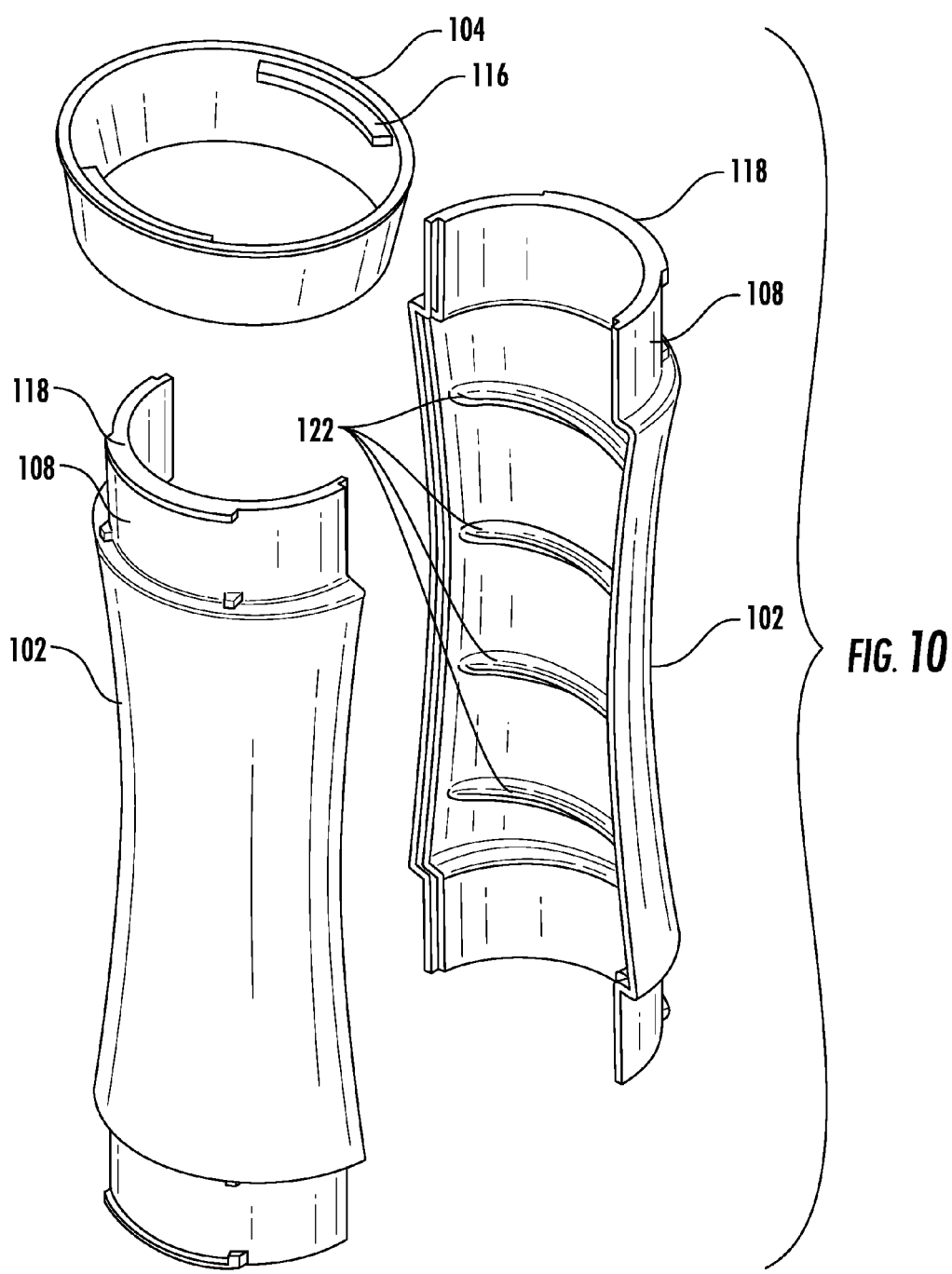
FIG. 10 is a perspective view of an example embodiment of the body of the produce shaker.

The first cap 104 may be configured to couple with the first mounting surface 108 on the first end of the body 102 by bayonet mounts, threads, clip-on, snap fit or magnets. FIG. 10 is a perspective view of an example embodiment of the body 102 of the produce shaker 100. For example, the first cap 104 may be coupled to the first mounting surface 108 by a bayonet mount. The bayonet mount is a fastening mechanism and may consist of a male side and a female receptor which when engaged with one another, fasten two components together. In this embodiment, the first cap 104 may have the male connector 116 while the first mounting surface 108 may have a female receptor 118. By twisting the first cap 104 onto the first mounting surface 108, the male connector 116 and the female receptor 118 engage together securing the first cap 104 to the first mounting surface 108.

In further embodiments, the first cap 104 may be coupled to the first mounting surface 108 by threaded caps, plugs, clip-on caps also known as lightning closures, resealable and non-resealable caps, twist-off and cork caps, bottle caps sports caps, hinged caps, valved caps, pull-off bottle caps, enclosable wire, ceramic caps, rubber caps, internal exposing cap, lids, closures, aluminum or plastic sheets, tops, foam and foam seals, child proof caps, glass, wood, metal, plastic, rubber or cork lids, plugs, tops or seals. The second cap 106 may be configured to couple with the second mounting surface 110 on the second end by the same method as the first cap 104, such as by bayonet mounts, threads, clip-on, snap fit, magnets or by a different method. In another embodiment, the second cap 106 may be fixed or permanent and non-removable, or be an integral part of the body 102.

The food or produce shaker 100 also may also include a frictional surface located on the inside surface of the body 102 and in the middle area of the body 102. FIG. 10 depicts an example embodiment of the inside surface of the body 102. The frictional surface 120 may be integral with the inside surface of the body 102 and may be capable of engaging with produce inside of the produce shaker 100 thus providing gripping and friction to aid in removing the outer surface from the produce. The frictional surface 120 may extend from the first end of the body 102 to the second end of the body 102. The frictional surface 120 may be made from plastic, composite, wood, metal, glass or any other form of rigid material.

Figure 11:
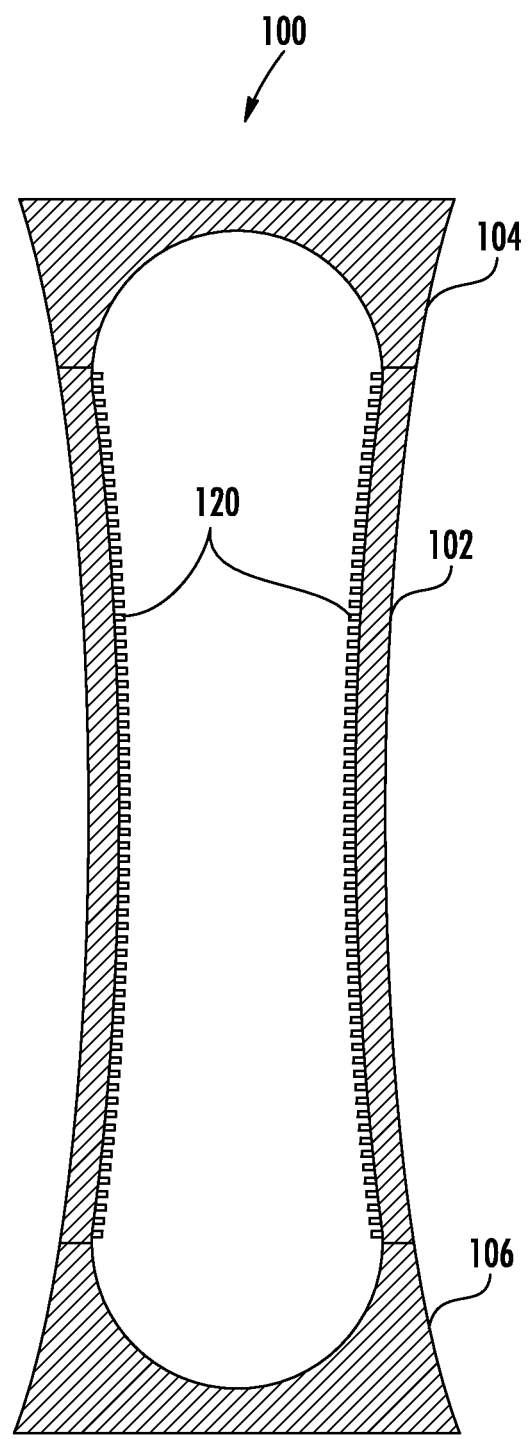
FIG. 11 is a sectional view of an example embodiment of the frictional surface as the plurality of ribbed rings.
Figure 12:
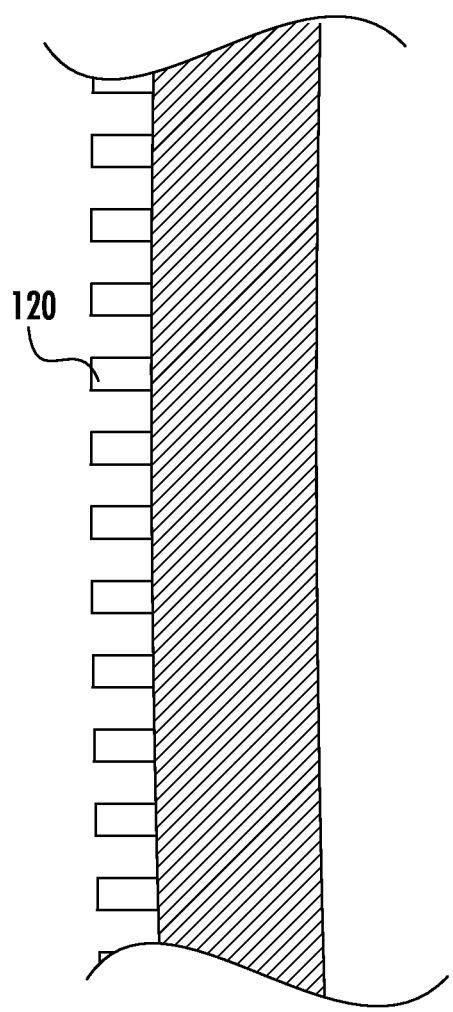
FIG. 12 is a section of an example embodiment of the frictional surface as the plurality of ribbed rings.

In one embodiment, the frictional surface 120 may be a plurality of ribbed rings which may be designed in rows. FIG. 11 is a sectional view of an example embodiment of the frictional surface 120 as the plurality of ribbed rings. FIG. 12 is a section of an example embodiment of the frictional surface 120 as the plurality of ribbed rings. The ribbed rings may be on the middle area of the body 102 and may extend along the interior surface of the body 102. In one example, the ribbed rings may extend approximately 6.35 millimeters in either direction from the middle area of the body 102 and may extend the entire length along the interior surface of the body 102. The ribbed rings may be approximately 6.35 millimeters in diameter with approximately 3.175 millimeters between the ribbed rings. The size and shape of the ribbed rings may vary to any suitable diameter, and the distance between the ribbed rings may be increased or decreased to any suitable width or length. This may provide a gripping and shearing surface so that when the produce within the produce shaker 100 comes into contact with the frictional surface 120, the outer surface of the produce is removed.

Figure 13:
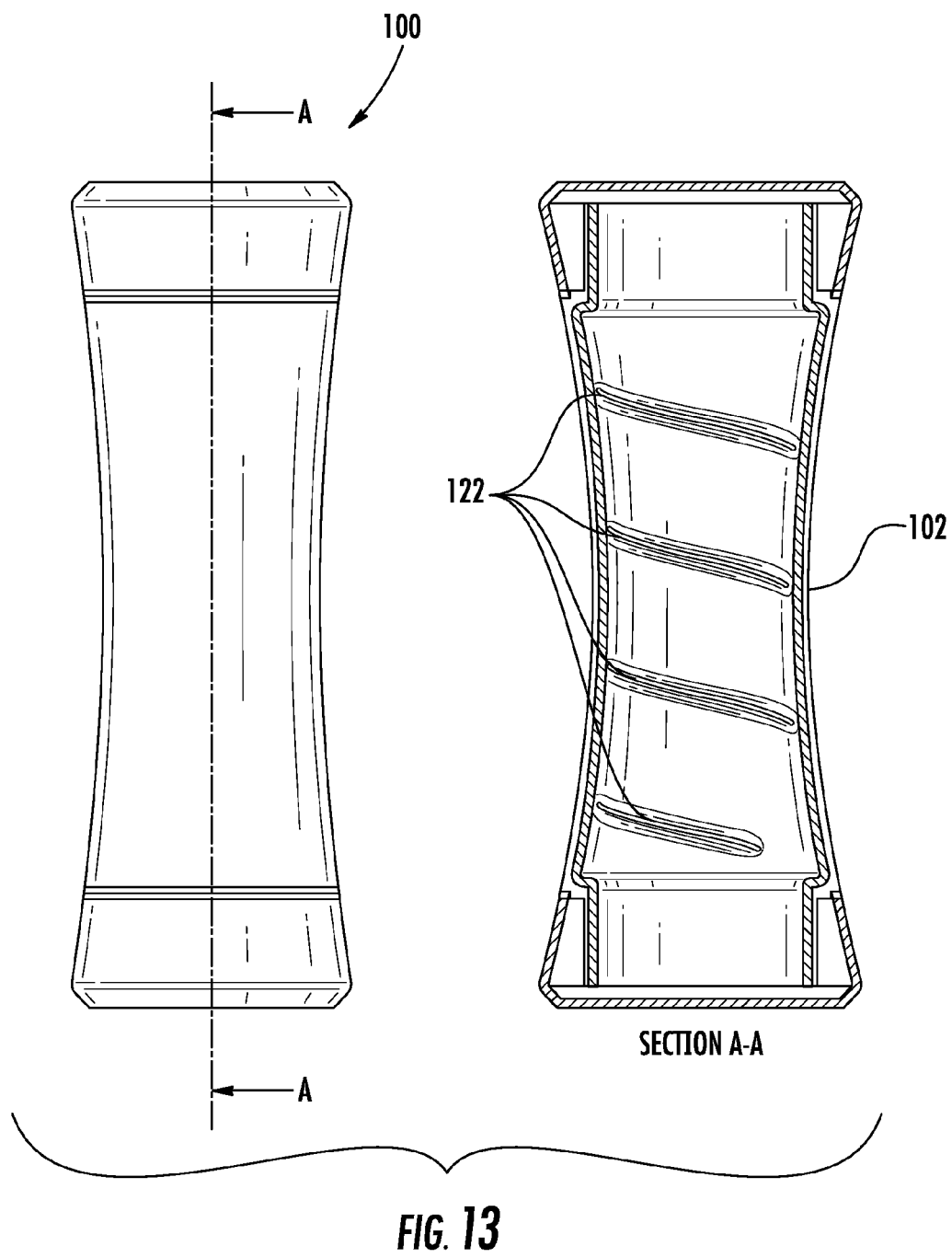
FIG. 13 depicts a sectional view of an example embodiment of the frictional surface as the plurality of spiral projections.

In another embodiment, the frictional surface 120 may be a plurality of spiral projections. FIG. 13 depicts a sectional view of an example embodiment of the frictional surface 120 as the plurality of spiral projections 122. In section A-A, the frictional surface 120, such as the plurality of spiral projections 122, may be coupled to the interior of body 102 and may protrude into the interior of body 102. This provides redirecting angles that cause the contents within the produce shaker 100 to gyrate, spin and rotate breaking apart and thus removing the outer surface from the produce. The plurality of spiral projections may be approximately 3.2 millimeters in diameter with approximately 38.1 millimeters between the spiral projections.

Figures 14, 15:
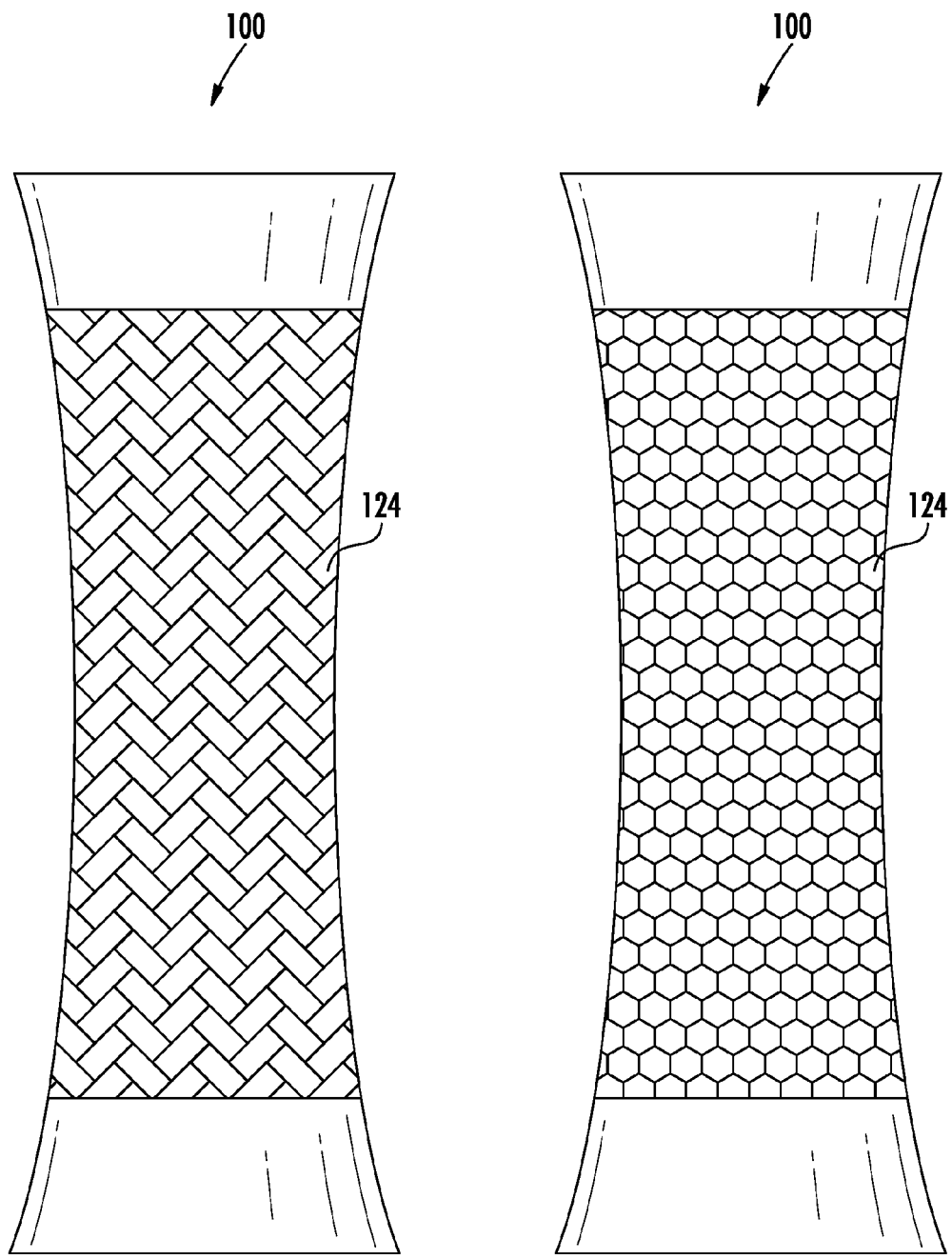
FIGS. 14 and 15 are example embodiments of the frictional surface as geometrically patterned surfaces.

In another embodiment, the frictional surface 120 may be a geometrically patterned surface. FIGS. 14 and 15 are example embodiments of the frictional surface 120 as geometrically patterned surfaces 124. In FIG. 14, the patterned surface 124 may be a thatched design while in FIG. 15 the geometrically patterned surface 124 may be a honeycomb design. Other geometrically patterns may be used to provide friction to aid in removing the outer surface from the produce such as, but not limited to, the aforementioned shapes.

Moreover, a method for removing an outer surface of a produce is disclosed. A rigid cylinder is provided having an inside surface, an outside surface, a middle area, a first end and a second end opposite the first end. The first end is open. A frictional surface on the inside surface of the cylinder and in the middle area of the cylinder is provided. The frictional surface is capable of engaging with produce placed inside the cylinder. A first mounting surface extending from the first end of the cylinder is provided. The produce is placed inside the cylinder. A first cap is coupled with the first mounting surface on the first end. The cylinder is shaken to engage the produce with the frictional surface and to remove an outer surface of the produce. The outside surface of the cylinder is configured to engage with a hand of a user.

Figure 16:
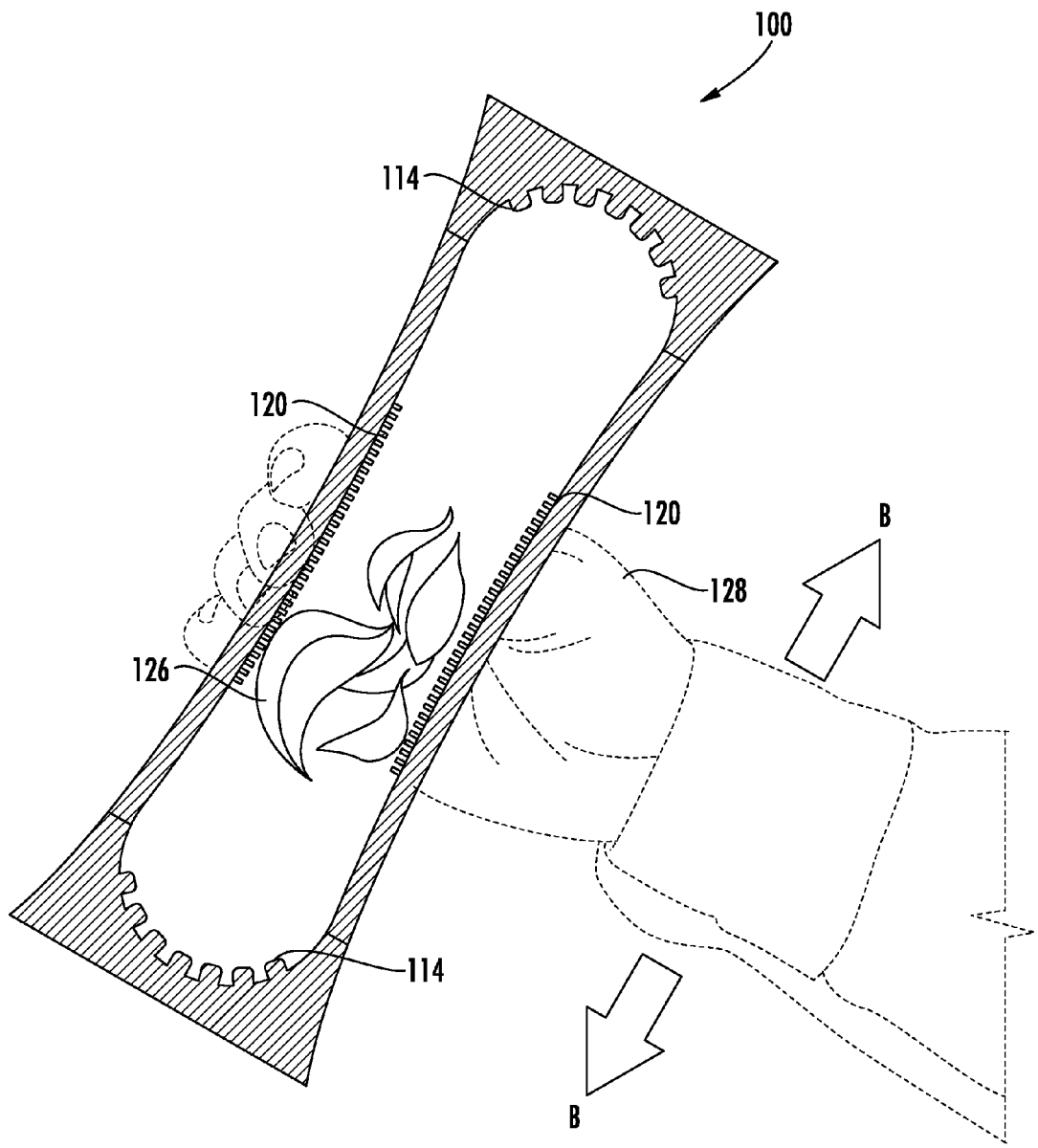
FIGS. 16 and 17 are example embodiments of the produce shaker 100 during use.
Figure 17:
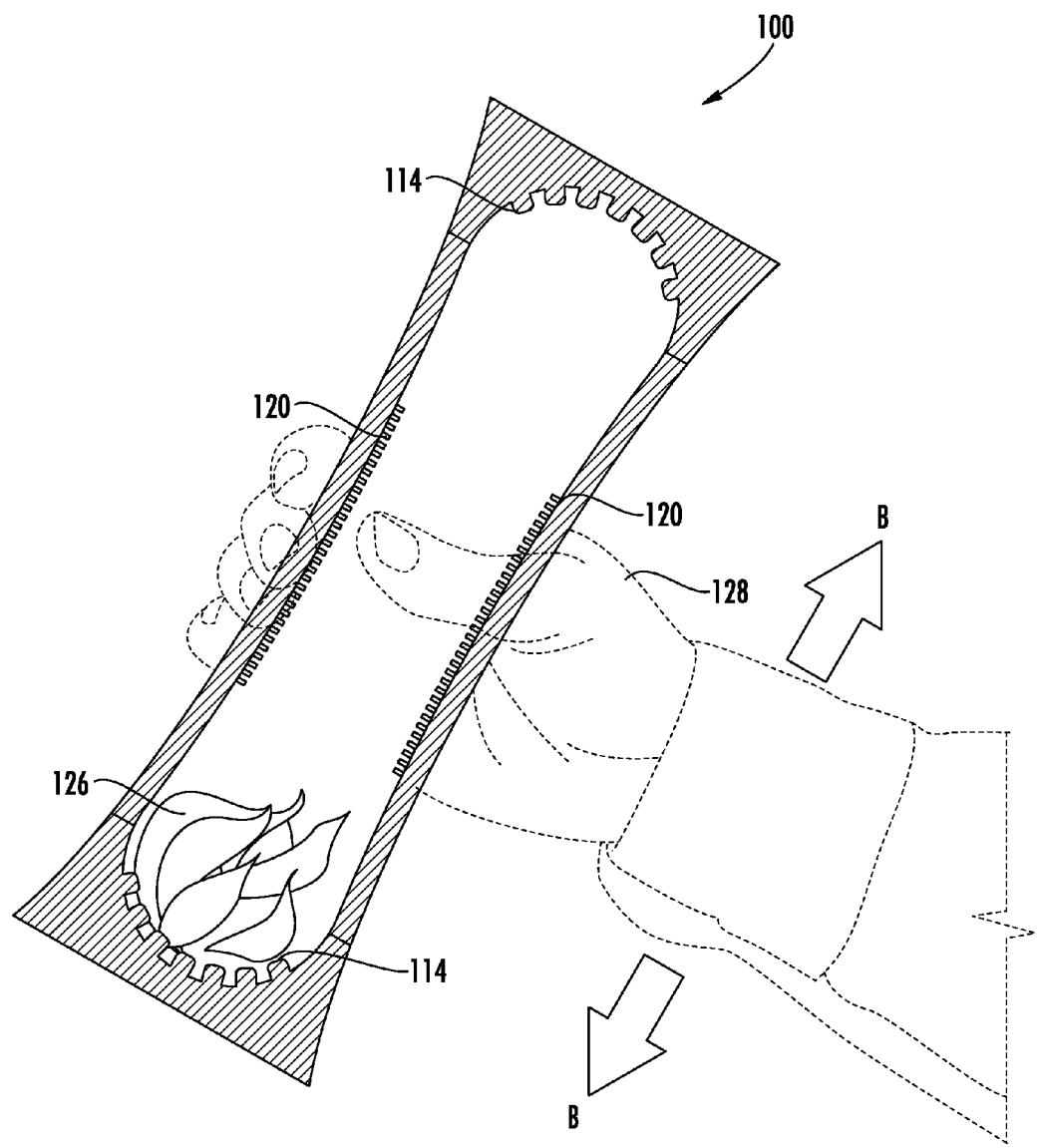

FIGS. 16 and 17 are example embodiments of the produce shaker 100 during use. In one embodiment, produce such as garlic or nuts, are inserted into the produce shaker 100. When a force is applied on the produce shaker 100, such as a shaking force provided by a user, the produce engages the frictional surface 120 and optionally, the plurality of protrusions 114 causing the outer surface of the produce to shear along the interior walls when this external force is exerted. As a result of the shearing effect, and because the produce breaks apart upon impact at each end, the outer surface of the produce is removed. The frictional surfaces 120 along the interior of the produce shaker 100 creates changes in motion and gripping action or shearing activity upon the contents when shaken. This enables the outer surface of the produce, such as garlic skin or nut shells, to be quickly removed.

For example, a head of garlic or the plurality of cloves of garlic 126, are inserted into the body 102 at the first end or the second end. In this embodiment, the first cap 104 and the second cap 106 are coupled to the first mounting surface 108 and the second mounting surface 110 respectively with bayonet mounts. After securing the first cap 104 and the second cap 106 at each end, the produce shaker 100 is shaken by a hand 128 of a user. The user may impart swift, fore/aft motions on the produce shaker 100 such as shaking. The shaking may be in a longitudinal direction, a horizontal direction, a combination of longitudinal and horizontal directions, or random motion.

The contents, or the garlic 126, are forced to make contact with the frictional surfaces 120 along the interior sides of the body 102. Additionally, as the garlic 126 is forced from one end of the produce shaker 100 to the other, contact may be made with the optional plurality of protrusions 114 on the first cap 104 and on the second cap 106 respectively, at each end of the produce shaker 100.

The shaking motion such in the direction of B, causes the garlic 126 to strike the frictional surface 120 and the plurality of protrusions 114 where shearing forces aid in breaking apart and removing the outer skin of the garlic 126. With the continued shaking motion, the garlic 126 moves, rotates and vibrates while striking the frictional surface 120 (and optionally the plurality of protrusions 114) causing only the outer surface of the garlic 126 to break apart, and the skin or shell is shaken off without difficulty. No significant damage is sustained by the cloves of the garlic 126. The process is repeated as the produce shaker 100 continues to be shaken.

In one embodiment, the outer surface of the produce, such as the skin of the garlic 126, may be removed in 10 to 60 seconds. When completed, the first cap 104 and/or the second cap 106 may be removed from first mounting surface 108 and/or second mounting surface 110. The garlic 126 and the removed skins may be poured out of the produce shaker 100 thereby ready for immediate use in food preparation.

In various embodiments, the produce shaker 100 may be made from plastic, composite, wood, metal, glass or any other food safe hard material. This provides a rigid container, which may create zones of hard surfaces for impact when an external force is applied, such as shaking. When the force is exerted by shaking, the contents may strike hard surfaces which aids to peel the outer surface off of the food.

To operate the produce shaker 100, a force is applied to the produce shaker 100. In various embodiments, the force may be generated manually or mechanically, for example, by using metal, wood, plastic, rubber, stone, ceramic, carbonate, aluminum or other various metals, glasses, polymers or hard surfaces to create mass. Various types of torque or force may be created and applied to the produce shaker 100 such as applied force, centrifugal force, gravitational force, normal force, friction force, air resistance force, tension force or spring force. The force may be created through the use of various types of energy. The needed energy may be created through electricity within a mechanical or electronic device, or manually through human effort. The energy applied creates the acceleration necessary for the mass of the food, and the mass of the device to enable impact and break apart the nut shells or remove the garlic skin.

In the embodiments illustrated in FIGS. 16 and 17, the outside surface of the produce shaker 100 is configured to engage with a hand 128 of the user about the circumference of the middle area of the body 102. To operate the produce shaker 100, a light, gripping force on the produce shaker 100 is needed. In one embodiment, the body 102 of the produce shaker 100 is hourglass shaped. This shape provides comfort for the user when the produce shaker 100 is gripped. The user may also grip the produce shaker 100 at other places such as at the first end or the second end.

The user does not need to be strong, or agile to operate the produce shaker 100. This is helpful for people with small hands, limited strength, or disabilities. The produce shaker 100 is easy and safe to use because the produce shaker 100 is a closed system, with no sharp edges or blades therefore making injury unlikely. For example, the produce shaker 100 may be used to remove the exterior shells from nuts. Typically, the hard, exterior shells of nuts are removed using crushing devices with exposed blades. Using these types of devices may injure the fingers, hands or eyes of the user during operation by imparting force, leading to cutting or producing flying debris. In contrast, the design of produce shaker 100 is fully enclosed containing the nuts and removed exterior shells while applying swift shaking forces without the use of sharp surfaces or blades. This process does not significantly damage or crush the nuts but only removes the outer shell. Additionally, the produce is contained and protected in the produce shaker 100 until it is poured out of one, or both ends. This also reduces the threat of flying debris, contamination through contact with other surfaces and the risk of food borne illness.

The features of the produce shaker 100 provide a quick, easy and safe way to load the produce into the produce shaker 100. For example, the first cap 104 may be removed from the first mounting surface 108, the contents may be placed into the produce shaker 100 then the first cap 104 may be secured on the first mounting surface 108. This process may be performed in a matter of a few seconds. Furthermore, the design also provides a quick, easy and safe way to clean the produce shaker 100. For example, the first cap 104 may be removed from the first mounting surface 108 and the contents may be poured out of the produce shaker 100. The second cap 106 may be removed from the second mounting surface 110 for additional access to the interior of the body 102. No sharp edges or blades are present within the produce shaker 100.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention. Furthermore, those of ordinary skill in the art will appreciate that the foregoing description is by way of example only, and is not intended to limit the invention. Thus, it is intended that the present subject matter covers such modifications and variations.

The invention claimed is:

1. A method for removing an outer surface of a produce comprising:

providing a rigid cylinder having an inside surface and an outside surface wherein the rigid cylinder is comprised of a first end, a second end opposite the first end, and a middle area between the first end and the second end, the first end being open;

providing a frictional surface on the inside surface of the cylinder and in the middle area of the cylinder, the frictional surface having elements capable of engaging with produce placed inside the cylinder;

providing a first mounting surface, the first mounting surface extending from the first end of the cylinder;

placing the produce inside the cylinder;

coupling a first cap with the first mounting surface on the first end, the first cap having a plurality of protrusions facing the inner surface of the cylinder, which are capable of engaging with the produce placed inside the cylinder; and shaking the cylinder to engage the produce with the elements of the frictional surface and the plurality of protrusions from the first cap to remove an outer surface of the produce;

wherein the elements of the frictional surface are different in at least one of a size, a shape and a pattern than the plurality of protrusions from the first cap; and wherein the outside surface of the cylinder is configured to engage with a hand of a user.

2. The method of claim 1, wherein the first cap is coupled to the first mounting surface by bayonet mounts, threads, clip-on, snap fit or magnets.

3. The method of claim 1, wherein the cylinder has a diameter of the middle area which is less than the diameter of the first end and less than the diameter of the second end.

4. The method of claim 3, wherein the cylinder has an hourglass shape.

5. The method of claim 1, wherein the pattern of the elements on the frictional surface comprises a plurality of spiral projections, each spiral projection in the plurality of spiral projections is approximately 3.2 millimeters in diameter with approximately 38.1 millimeters between the spiral projections.

6. The method of claim 1, wherein the elements on the frictional surface are made from plastic, composite, wood, metal or glass.

7. The method of claim 1, wherein upon shaking the cylinder, the outer surface of the produce is removed in 10 to 60 seconds.

8. The method of claim 1, wherein the produce to be peeled is garlic.

9. The method of claim 1, wherein each protrusion in the plurality of protrusions is approximately 6.35 millimeters in diameter, extending toward the second end opposite the first end, with approximately 3.175 millimeters between a neighboring protrusion.

* * * * *